UNITED STATES PATENT OFFICE.

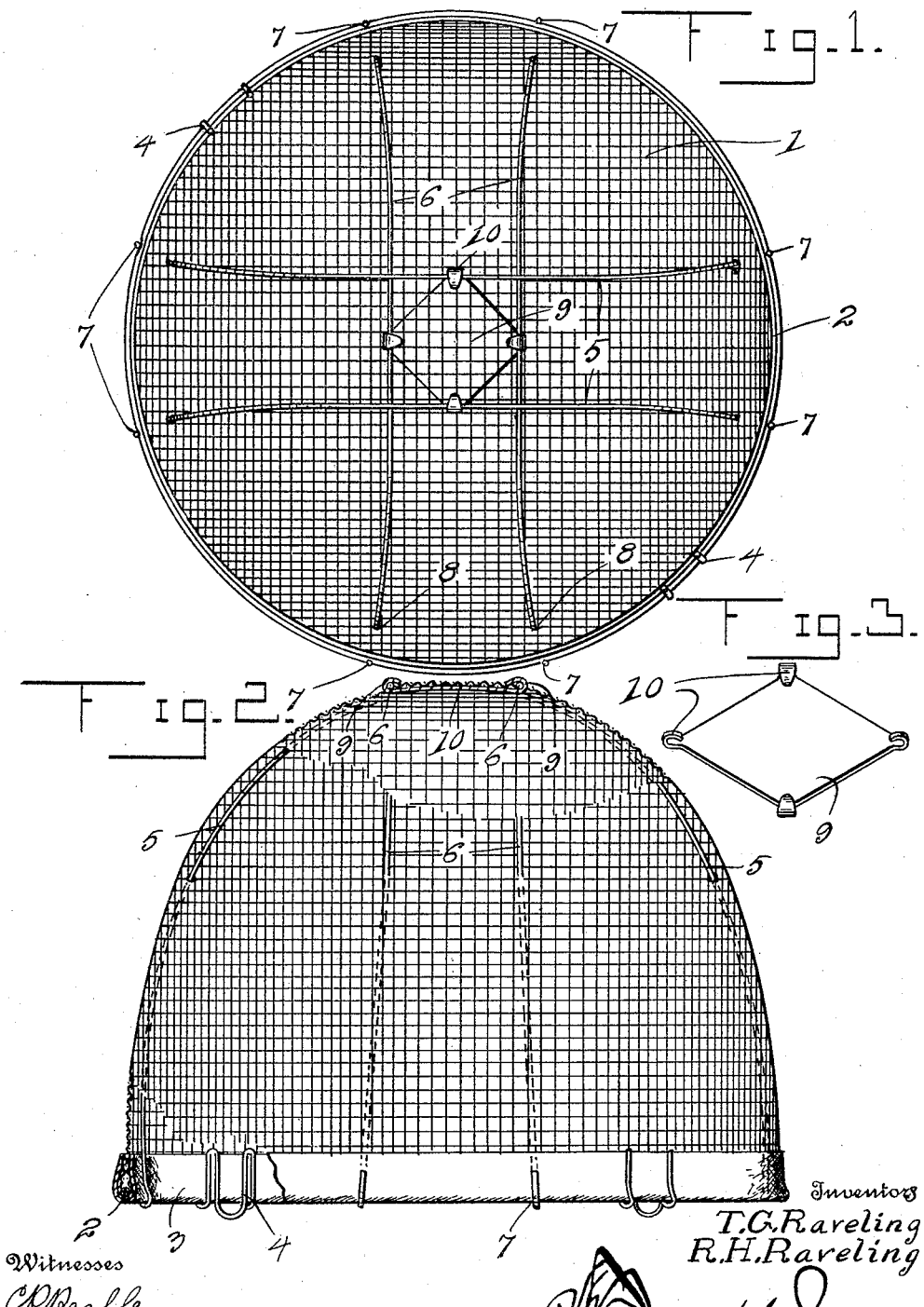

TJEBBE G. RAVELING AND RUDOLPH H. RAVELING, OF BUFFALO, NORTH DAKOTA.

FLY-SHIELD.

1,110,232. Specification of Letters Patent. Patented Sept. 8, 1914.

Application filed August 1, 1913. Serial No. 782,541.

*To all whom it may concern:*

Be it known that we, TJEBBE G. RAVELING and RUDOLPH H. RAVELING, citizens of the United States, residing at Buffalo, in the county of Cass and State of North Dakota, have invented certain new and useful Improvements in Fly-Shields; and we do hereby declare the following to be a full, clear, and exact description of the invention, such as will enable others skilled in the art to which it appertains to make and use the same.

This invention relates to new and useful improvements in fly shields and has for its object the provision of a device of the above character which is adapted to be attached to the nose of animals and which will prevent said animals from being annoyed from the bite of insects.

Another object of our invention is the provision of such a device which will be reinforced and provided with a plate to prevent the animal upon which the device is being used from pushing its nose through the screen forming the shield.

With the above and other objects in view we now proceed to describe our invention in the following specification and accompanying drawings, in which, Figure 1 is a top plan view of our improved fly shield, Fig. 2 is a side view of our improved fly shield showing the same with certain parts broken away to clearly illustrate the structure thereof, and Fig. 3 is a detail perspective view of the plate used in connection with my improved fly shield.

Referring to the drawings by characters of reference 1 indicates the body portion of our improved fly shield which is formed of a suitable wire mesh, such as is used for the ordinary type of screens. This body portion 1 is preferably supported by means of the annular ring 2 which extends around and forms the framework of the device. This ring 2 is preferably formed of wire and provided with the binding strips 3 which are of suitable flexible material, such as leather or felt and are adapted to provide a protection for the nose of the animal and prevent chaffing of the flesh thereof. Suitable wires 4 are secured to the ring 2 and are adapted to act as a means to connect the shield to the harness by means of which the same is held in place.

The reinforcing members used in connection with our improved fly shield preferably comprise the wires 5 and 6 which are arranged at right angles to each other to form a central square as clearly shown in Fig. 1. These wires are joined to the ring 2 as shown at 7 and extend upwardly on the interior of the shield to a point indicated by the numeral 8 where they are passed through one of the openings in the shield and continue on the exterior thereof until they reach a point opposite the point 8 on the other side of the shield, as will be apparent upon referring to Fig. 1 of the drawings.

A suitable plate 9 which is preferably rectangular in shape has formed integrally therewith the ears 10 which extend outwardly therefrom and are adapted to be bent upwardly, as illustrated, to receive the wires 5 and 6, and hold the same firmly in place. This plate 9 is adapted to lie beneath the screen forming the body portion of our improved fly shield and act as a guard to prevent the screen from wearing at this point. This plate is also arranged to hold the wires 5 and 6 firmly in position and prevent them from becoming displaced.

It will be apparent from the foregoing that with our improved device the screen will be materially strengthened by the use of the plate 9 and the wires 5 and 6 which will act to hold the same in the desired position and prevent its sagging and losing its contour.

While in the foregoing we have shown and described the preferred embodiment of our invention we wish it to be understood that we may change the specific arrangement and combination of parts without in any way departing from the spirit and scope of our invention as defined in the claims appended hereto.

What we claim is:—

1. A device of the character described comprising a ring, a dome shaped body portion secured to said ring, said dome shaped body portion being composed of a wire mesh, supporting wires extending downwardly from the ring on the interior of the mesh for a portion of their length, and lying outside thereof for the remaining distance, and a plate secured to the inside of the body portion at its lowermost extremity and having ears formed thereon and arranged to engage the wires to hold the mesh and wires firmly in place.

2. A device of the character described comprising a ring, a dome shaped body portion secured to said ring, said dome shaped body portion being composed of a wire mesh, supporting wires secured to the ring at spaced intervals, said supporting wires being arranged to lie partly on the inside and partly on the outside of the wire mesh, and a plate at the lower extremity of the dome shaped body portion and having ears formed thereon to engage the wires and hold the whole together.

3. In a device of the character described, a ring, a dome shaped body portion secured to said ring, said dome shaped body portion being composed of a wire mesh, and supporting wires secured to the ring, said supporting wires being arranged to lie partly on the inside and partly on the outside of the wire mesh.

4. In a device of the character described, a ring, a dome shaped body portion secured to said ring, said dome shaped body portion being composed of a wire mesh, supporting wires secured to the ring, said supporting wires being arranged to lie partly on the inside and partly on the outside of the wire mesh, and a plate at the lower end of the dome shaped body portion to hold the supporting wires firmly in place.

In testimony whereof we affix our signature in presence of two witnesses.

TJEBBE G. RAVELING.
RUDOLPH H. RAVELING.

Witnesses:
EDW. M. MASTERSON,
OSCAR KRISTIANSEN.

Copies of this patent may be obtained for five cents each, by addressing the "Commissioner of Patents, Washington, D. C."